(12) United States Patent
Zirbs

(10) Patent No.: US 6,954,973 B2
(45) Date of Patent: Oct. 18, 2005

(54) ASSEMBLY SYSTEM AND METHOD FOR INSTALLING A ROOF MODULE INTO A VEHICLE BODY

(75) Inventor: Thomas Zirbs, Weil der Stadt (DE)

(73) Assignee: DaimlerChrysler AG, Stuttgart (DE)

( * ) Notice: Subject to any disclaimer, the term of this patent is extended or adjusted under 35 U.S.C. 154(b) by 246 days.

(21) Appl. No.: 10/234,853

(22) Filed: Sep. 5, 2002

(65) Prior Publication Data

US 2003/0070272 A1 Apr. 17, 2003

(30) Foreign Application Priority Data

Sep. 5, 2001 (DE) .......................................... 101 43 379

(51) Int. Cl.$^7$ .......................... B23Q 17/00; B23P 21/00
(52) U.S. Cl. ............................... 29/407.04; 29/407.01; 29/709
(58) Field of Search ............................ 29/407.04, 709, 29/711, 720, 407.09, 430, 824, 407.01; 269/216.07

(56) References Cited

U.S. PATENT DOCUMENTS

| | | |
|---|---|---|
| 4,538,044 A | 8/1985 | Kadowaki et al. |
| 6,339,874 B2 * | 1/2002 | Segawa et al. ............... 29/824 |
| 6,340,204 B1 * | 1/2002 | Seifert ................... 296/216.07 |

FOREIGN PATENT DOCUMENTS

| | | |
|---|---|---|
| DE | 3624642 A1 | 1/1988 |
| DE | 4024837 A1 | 2/1992 |
| DE | 3912242 C2 | 4/1992 |
| DE | 4422380 A1 | 6/1995 |
| DE | 4428913 A1 | 2/1996 |
| DE | 19502019 C1 | 8/1996 |
| DE | 19728580 A1 | 1/1998 |
| DE | 19817056 A1 | 10/1999 |
| GB | 2312876 A | 11/1997 |

* cited by examiner

*Primary Examiner*—John C. Hong
(74) *Attorney, Agent, or Firm*—Crowell & Moring LLP

(57) ABSTRACT

An assembly system for automatic installation of a roof module in a vehicle body comprises an adhesive bonding station, in which a cylindrical dose of adhesive is applied to the inside of the roof module, and an assembly robot, whereby the roof module is then inserted into the body delivered on an assembly line. For accurate positioning and fixing of the roof module in the roof opening of the body, the assembly robot is provided with a floatingly mounted assembly tool. On the assembly tool are provided centering tools by which the assembly tool can be positioned with high accuracy relative to the roof module and the body. In addition, fixing hooks are provided on the assembly tool and permit a controlled firm pressing on the roof module into the roof opening of the body.

49 Claims, 4 Drawing Sheets

ASSEMBLY SYSTEM AND METHOD FOR INSTALLING A ROOF MODULE INTO A VEHICLE BODY

This application claims the priority of German application 101 43 379.4, filed Sep. 5, 2001, the disclosure of which is expressly incorporated by reference herein.

BACKGROUND AND SUMMARY OF THE INVENTION

The present invention relates to an assembly system for installing a roof module, especially a glass roof, in a roof opening of a vehicle body delivered on an assembly line.

The use of adhesive bonding techniques for fixing vehicle roofs in vehicle bodies is known from German documents DE 40 24 837 A1, DE 44 28 913 A1 and DE 195 02 019 C1. Such adhesive connections guarantee a high degree of crash-proofing, make it possible to compensate for tolerances and ensure that the external region of the body is sealed off from the passenger compartment in a watertight manner. German document DE 40 24 837 A1 also discloses a method for adhesively bonding a sliding roof module to a vehicle body. In this method, a cylindrical dose of adhesive is mechanically and automatically applied to the roof opening of the body. The sliding roof module is then lowered onto the body; the intention is that the cylindrical dose of adhesive will be compressed by the weight of the sliding roof module and a process-proof adhesive bonding of the roof module to the body will be achieved.

However, the method described in German document DE 40 24 837 A1 is time-consuming, as the body must be stationary during the application of the adhesive and the subsequent installation of the roof module until the adhesive has set. Moreover, any error occurring during application of the cylindrical dose of adhesive to the (previously finished) body involves high secondary costs: the body concerned has to be transferred out from the assembly line and carefully cleaned.

It is an object of the present invention to provide an assembly system for the installation of roof modules in vehicle bodies that avoids the abovementioned problems.

This object is achieved, according to the invention, by the claimed assembly system for installing a roof module in a roof opening of a vehicle body delivered on an assembly line. The assembly system includes an adhesive bonding station comprising a bonding robot for applying a cylindrical dose of adhesive to an inside of the roof module, an insertion station comprising an assembly robot for inserting the roof module provided with adhesive into the body, a first handling device for supplying the roof module to the adhesive bonding station and positioning it therein, a second handling device for removing the roof module from the adhesive bonding station and supplying it to the insertion station, and a control system for controlling the bonding robot, the assembly robot, and the handling devices. A roof module installation process is also claimed.

According to certain features of the invention, the cylindrical dose of adhesive is applied not to the vehicle body but to the roof module, which is subsequently positioned with high accuracy relative to the roof opening of the vehicle body and fixed therein. The associated assembly system comprises a bonding robot which applies a cylindrical dose of adhesive to the inside of the roof module. The roof module, provided with the adhesive, is passed by means of a handling device to an assembly robot, which inserts it with accurate positioning into the roof opening of a body delivered on an assembly line. A control system is provided to control and monitor the assembly operation.

Advantageous synchronization of the method steps of delivering the body on the assembly line on the one hand and applying the adhesive to the roof module on the other hand allows a substantial saving of time to result from the assembly system according to the invention as compared with conventional assembly methods. In contrast to the conventional methods, where the assembly system according to the invention is used, the body needs to be stationary only during the insertion of the roof module. The application of the cylindrical dose of adhesive to the roof module and the delivery of the roof module, provided with the adhesive, onto the assembly line can then take place before the point at which the body is transferred by the assembly line to the installation station.

Furthermore, where the assembly system according to the invention is used, errors in the application of the adhesive, such as smearing, premature setting of the adhesive, etc., are associated with much lower costs than in the case of conventional methods: in the event of defective application of the adhesive, the roof module in question is transferred out and at the same time a new roof module is provided with adhesive and inserted into the body. This is much less costly than the outward transfer of a contaminated body from the assembly line, cleaning and return to the assembly line that are necessary in the case of the conventional methods. The transferred roof module is cleaned and delivered again, without the assembly cycle or the assembly sequence of vehicle bodies being affected thereby.

The assembly system according to the invention permits fully automated assembly of the roof module even under the very cramped conditions in the immediate vicinity of an assembly line. The roof modules are advantageously delivered to the assembly system in load carriers that contain a plurality of roof modules. In a first step, they are separated and laid in templates with the inside upwards, so that they are already in an advantageous attitude for the application of the cylindrical dose of adhesive. To fix the roof modules in this attitude, the templates are expediently provided with automatic tensioning elements (e.g. suction cups which grip onto the outside of the roof module).

In order to deliver the roof modules laid in the templates to the adhesive bonding station, the assembly system comprises a first handling device. In order to avoid soiling of the joint regions of the roof modules during transfer and handling, the joint regions are in many cases covered with protective adhesive tapes directly after production of the roof module. Before the roof modules are delivered to the adhesive bonding station, these protective adhesive tapes have to be removed in order to expose the joint regions on the roof modules. For this purposes, a fully automated stripping device can be used. In that event, the protective adhesive tapes are expediently provided with projecting gripping loops; the stripping device grips these loops and strips off the protective adhesive tapes. Alternatively, the protective adhesive tapes can be stripped off manually. In that event, for ergonomic reasons, the roof module should be tilted in order to permit easy access to the protective adhesive tapes in all marginal areas of the roof module. Therefore, in this case, a pivoting device is provided by means of which the roof module fixed on the template is pivoted through approximately 80° about its longitudinal axis; after removal of the protective adhesive tapes by an operative, the roof module is pivoted back again into its initial position.

Immediately after the removal of the protective adhesive tapes, the roof module fixed on the template—with the inside upwards—is delivered to the adhesive bonding station where cylindrical doses of adhesive are applied to the joint regions. The adhesive is applied by means of a bonding robot, which travels along a pre-programmed bonding path with the aid of a CNC control system and in so doing deposits a cylindrical dose of adhesive on the joint regions by means of an adhesive nozzle. In order to ensure process-proof application of the cylindrical dose of adhesive, the adhesive nozzle is pressed by means of a spring against the roof module. The state of tension of the spring is continuously monitored, so that a defective contact between the adhesive nozzle and the roof is detected immediately and suitable counter-measures can be taken.

After application of the cylindrical dose of adhesive, the roof module is removed from the template by means of a further handling device and delivered to the assembly robot. For this purpose, the roof module is first advantageously tilted through 180° about its longitudinal axis in order to bring it in the installation position. In this attitude, the roof module is gripped by the assembly robot, by means of which the roof module is inserted into the roof opening of the body.

The insertion of the roof module into the body has to take place with extreme precision in order to ensure a high-quality visual impression made by the finished vehicle. In particular, the roof module must be oriented with high precision in the transverse direction of the body coordinate system relative to the roof opening in order to produce uniform gaps on both sides between the edges of the roof module and the roof struts of the body, into which clip-on trim strips are introduced in a subsequent assembly step. In order to guarantee such precise positioning of the roof module in the body, it is advantageous to install the roof module by means of an assembly tool which is mounted floatingly relative to the assembly robot. The tracking movement of the assembly robot corresponds to a permanently programmed CNC path; the floating mounting then permits compensation for tolerance-induced inaccuracies in the geometric dimensions and/or position of the roof module and/or of the body delivered on the assembly line, so that precise orientation of the roof module relative to the body can be achieved.

A precondition for this is that the roof module can be received in the assembly tool in a manner such that a high-precision orientation of the roof module relative to the assembly tool is ensured. For this purpose, the assembly tool is provided with (first) centering tools, whereby centering of the roof module relative to the assembly tool is achieved. Furthermore, the assembly tool is provided with additional (second) centering tools, by means of which accurate positioning of the assembly tool relative to the roof opening of the vehicle body is achieved. Thus, the roof module is gripped in a defined position relative to the assembly tool of the assembly robot, transferred to the body and inserted there in a defined position relative to the roof opening.

Once the roof module has been inserted into the roof opening of the body, the cylindrical dose of adhesive is compressed under the dead weight of the roof module. Experience suggests that it is extremely difficult here to dimension the quantity of adhesive applied or the distance between the regions of the roof module and of the roof opening to be bonded in such a way that the roof module sinks under its dead weight into the vehicle body in a process-proof manner and by exactly the right distance. In order to achieve a high-precision vertical orientation of the roof module relative to the roof opening, it is therefore advantageous to increase the size of the quantity of adhesive to be applied (or reduce the size of the distance between roof module and roof opening in the connection region) and to press the roof module with additional force while it is being inserted into the roof opening. For this purpose, the assembly tool is provided with fixing hooks which—after the roof module has been inserted into the vehicle body—engage into the window openings of the body and pull down the assembly tool to a level relative to the body roof that has been previously defined with high precision. In this manner, a reproducible vertical orientation of the roof module relative to the surrounding body roof can be achieved. The exertion of force by means of the fixing hooks is typically maintained for a few seconds until initial setting of the adhesive takes place and the roof module is fixed in that position.

In order to carry out a rapid quality control on the bodies—especially at the start of line production or in the event of equipment or design modifications—in relation to the size of the gaps between roof opening and roof module, it is advisable to provide the assembly system with a sensor system for detecting relevant measured parameters of the body and the roof module. Particularly advantageous is the use of optical sensors—for example, light-section sensors—by means of which a rapid contact-free detection and analysis of the gap sizes can be carried out before insertion of the roof module has ended; in the event of defective insertion, the position of the roof module can be adjusted immediately—i.e. before the adhesive has set—with the aid of the assembly tool.

The assembly system is particularly suitable for use on assembly lines on which different versions of motor vehicles are assembled, only selected motor vehicles needing to be provided with a roof module to be installed in the course of assembly whereas other vehicles have already been provided with a (welded-in) solid roof at the carcass stage. In order to ensure a smooth assembly of the different versions, it is advantageous to feed early information to the control system of the roof module assembly system on the points within the assembly sequence where vehicle bodies are present which have to be fitted with a roof module. This permits prompt commencement of the application of adhesive to the roof module to be inserted at the same time as the body in question is being delivered to the assembly line, so that the body reaches the assembly station at the same time as the adhesive-coated roof module. As a result, the time requirement associated with the bonding-in of the roof module is minimized. Furthermore, the adhesive is here prevented from being applied to the roof modules too early (or at the wrong time), which can result in setting of the adhesive before the roof module has been inserted into the body and hence increased reject rates or remedial work.

In an advantageous embodiment of the invention, the bodies are provided on the assembly line with electronically or optically readable mobile data storage media which contain information on the equipment of the particular vehicle body. The data from these mobile data storage media are read out with the aid of a sensor located at a suitable distance from the roof module assembly station at the edge of the assembly line and transmitted to the control system of the assembly system which analyses them to determine whether or not the installation of a glass roof is necessary. If a data set reaching the control system contains the requirement that a roof module is to be inserted, the control computer triggers the application of adhesive and the delivery of the roof module so that the roof module reaches the assembly station (as nearly as possible) simultaneously with the body.

BRIEF DESCRIPTION OF THE DRAWINGS

The invention is explained in detail below with reference to an embodiment shown in the drawings.

DETAILED DESCRIPTION OF THE INVENTION

Figure 1:
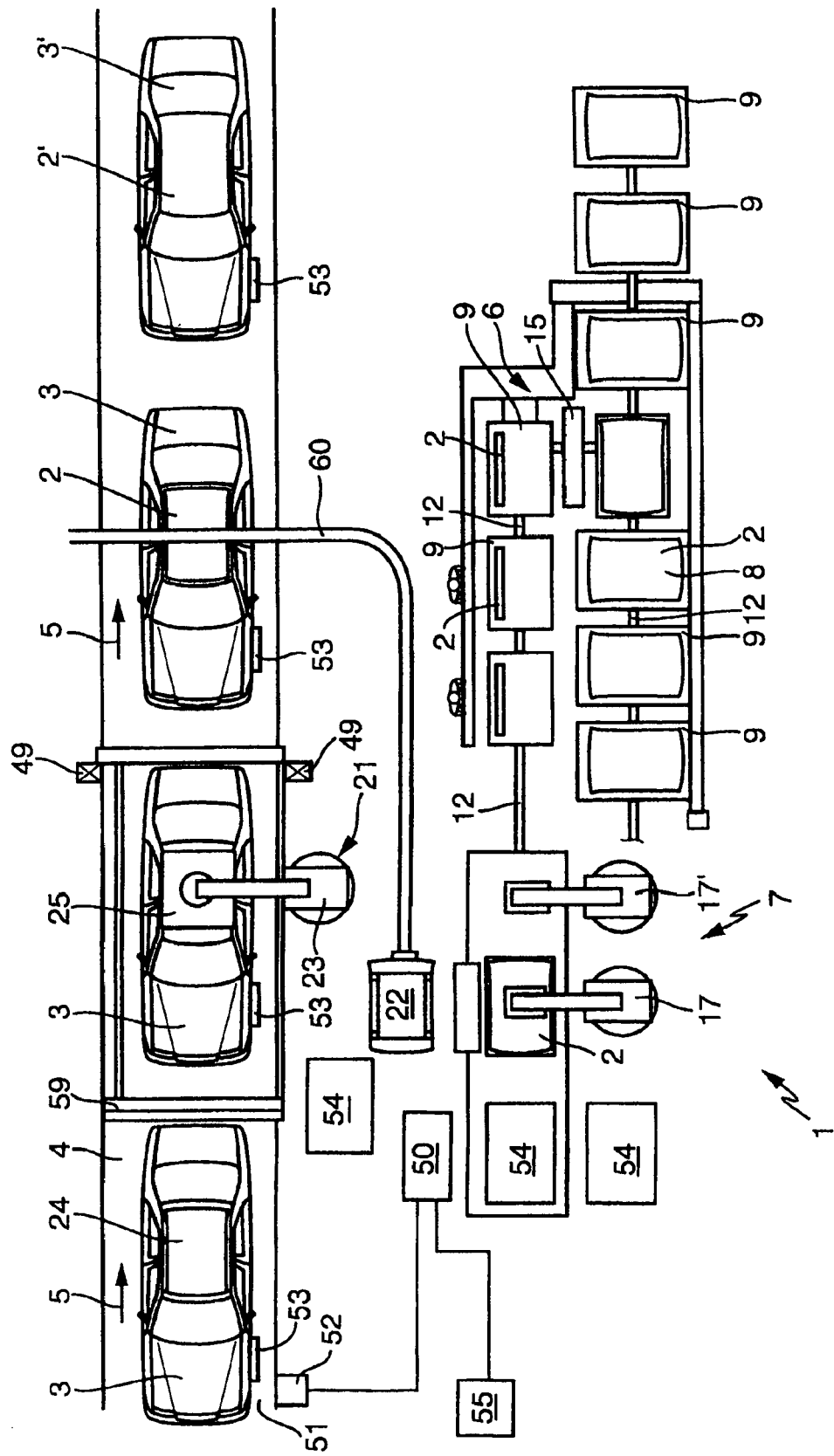
FIG. 1 shows a plan view of a system layout of an assembly system according to the invention for roof modules.

FIG. 1 shows a system layout of an assembly system 1 according to the invention for the installation of roof modules 2 in vehicle bodies 3. The vehicle bodies 3 are delivered to the assembly system 1 on an assembly line 4, whose direction of movement is indicated by an arrow 5 in FIG. 1.

The roof modules 2 are supplied to the assembly system 1 on load carriers (not shown in FIG. 1), in each of which a plurality of roof modules 2 are contained, stacked one above the other in the installation position. In the case of complex roof modules 2 (for example, glass sliding roofs) each load carrier typically contains from six to ten roof modules 2, which are stacked one above the other in the installation position on the load carrier. By means of a first handling device 6 the roof modules 2 are delivered to an adhesive bonding station 7 in which their insides 8 are provided with cylindrical doses of adhesive 16. For this purpose, in a first method step, the roof modules 2 are unstacked from the load carriers and introduced individually into mobile templates 9. This unloading may take place manually or with the aid of an automated unstacking device (not shown in FIG. 1).

Figure 2:
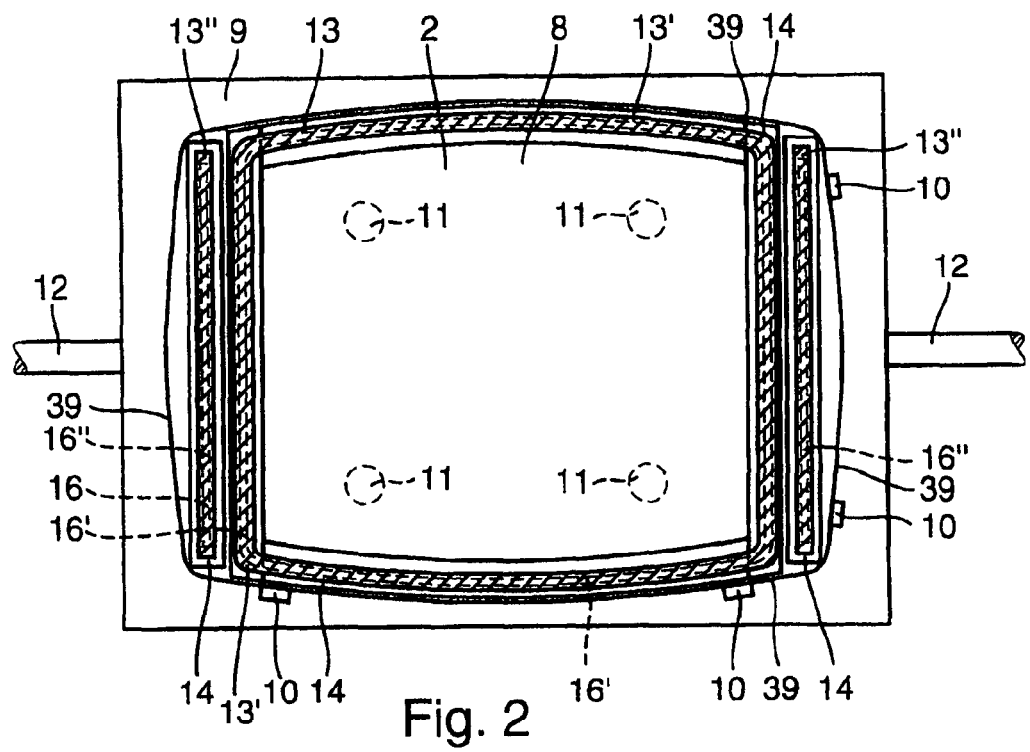
FIG. 2 shows a detailed view of the inside of a roof module.

Advantageously, the roof modules 2—if they are delivered in the installation position—are tilted through 180° about their longitudinal axes in the course of their removal from the load carriers, so that they are each laid in the templates 9 with the inside 8 upwards. This has the advantage that the roof modules 2 are then already in an attitude favorable for the application of the cylindrical dose of adhesive. FIG. 2 shows a detailed view of the inside 8 of a roof module 2 laid on a template 9. For the exact positioning of the roof module 2, the template possesses stops 10, which are shown diagrammatically in FIG. 2. To fix the attitude of the roof module in the template 9, the latter is also provided with tensioning elements 11 (for example, suction cups, which engage on the outside of the roof module, or alternative elements engaging on the edge 39 of the roof module 2). To move the templates 9, use is made of a fully automatic conveyor device 12, by means of which loaded templates 9 are fed to an adhesive bonding station 7 in a selected sequence, moved singly into and out of waiting positions and transferred back again in the unloaded state into the starting position, where they stand ready to receive a new roof module.

As is shown in FIG. 2, the inside 8 of the roof module 2 possesses joint regions 13, in the region of which cylindrical doses of adhesive are to be applied; these joint regions are shown by hatching in FIG. 2. In the present embodiment, a peripheral joint region 13' is provided on the roof module 2; the cylindrical dose of adhesive 16' to be applied in this region, indicated by broken lines in FIG. 2, both fixes the roof module 2 in the roof opening 24 and seals the interior of the vehicle against the external environment. Furthermore, an additional joint region 13" is provided both at the rear and at the front in the direction of the vehicle; in this region 13" a supporting cylindrical dose of adhesive 16", indicated in broken lines in FIG. 2, is applied, whereby increased stability and rigidity of the complete body 3 is achieved. The cylindrical doses of adhesive 16', 16" may be of one-piece form or may consist of a plurality of partial doses.

The roof modules 2 delivered are provided in the joint regions with protective adhesive tapes 14 which are intended to protect these regions 13 from soiling during transfer. Before the cylindrical doses of adhesive 16 are applied to the roof modules, these protective adhesive tapes 14 are manually removed. For this purpose, the roof module 2 is pivoted in a pivoting station 15, together with the template 9, through approximately 80° about its longitudinal axis; when this occurs, the inside 8 of the roof module 2 is turned towards the operative responsible for stripping off the protective adhesive tape 14, so that the regions of the adhesive tapes 14 are easily accessible to the operative. The stops 10 and/or the tensioning elements 11 ensure here that the roof module 2 does not unintentionally slip out of the template 9 during the swinging. The operative now strips off the protective adhesive tapes 14. Thereafter, the roof module 2 is pivoted back again into its starting position and fed to the adhesive bonding station 7. As an alternative to the protective adhesive tapes 14, the joint regions 13 may also be masked, for example, by a protective layer sprayed on as a liquid (for example, a PVC composition) which must be removed before the (manual or mechanical) application of the adhesive.

In the adhesive bonding station 7, cylindrical doses of adhesive 16 are applied to the joint regions 13 on the inside 8 of the roof module 2. For this purpose, a (five- or six-shafted) bonding robot 17 is used, which deposits the cylindrical dose of adhesive 16 via an adhesive nozzle 18 on the joint region 13 (see FIG. 3). In the embodiment shown in FIG. 1, a second (replacement) bonding robot 17' is also provided in addition to this (main) bonding robot 17; this bonding robot 17' serves as a back-up in order to prevent failure of the complete system 1 as a result of failure of the (main) bonding robot 17.

The bonding robot 17 follows a programmed-in CNC path which corresponds to the desired position of the cylindrical doses of adhesive 16 on the inside 8 of the roof module 2. The outlet aperture 18' of the adhesive nozzle 18 has a triangular profile and is pressed by means of a spring 19 onto the inside 8 of the roof module 2.

Figure 3:
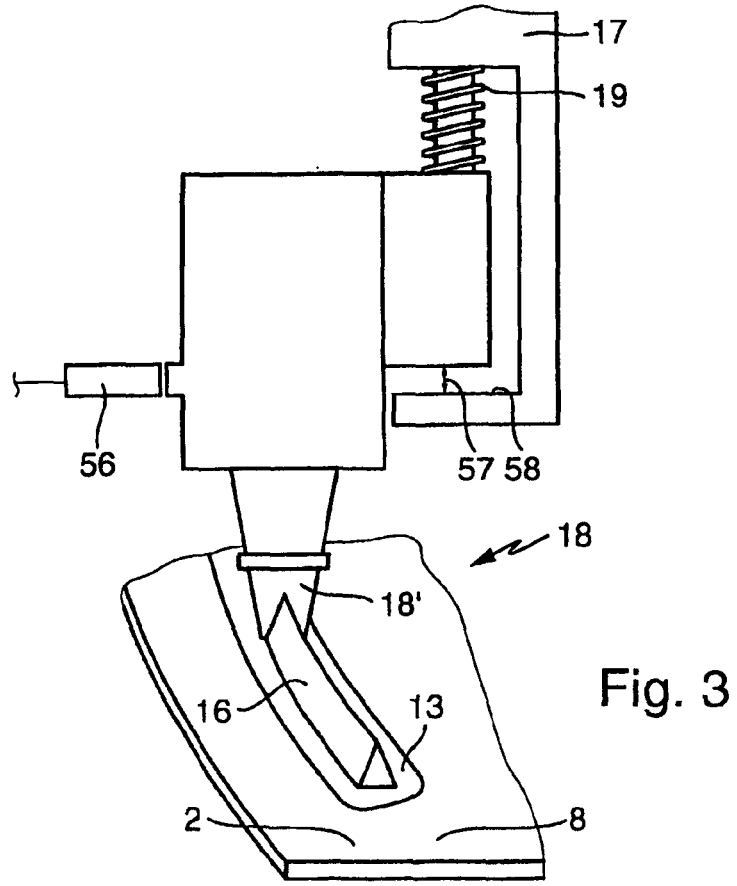
FIG. 3 shows a detailed view of the adhesive nozzle during application of a cylindrical dose of adhesive to a roof module.

This spring 19 guarantees a permanent contact between the adhesive nozzle 18 and the roof module 2 (and hence a uniform profile of the cylindrical dose of adhesive 16) and simultaneously permits the monitoring of the adhesive bonding process. By means of a sensor 56, which in the example shown in FIG. 3 is in the form of an inductive proximity sensor, the vertical deviation 57 of the adhesive nozzle 18 relative to a stop 58 on the bonding robot 17 is continuously checked. If the vertical deviation 57 differs from a predetermined target value (for example, because of an absence of contact between the adhesive nozzle 18 and the roof module 2), this is immediately detected by the sensor 56. Advantageously, a warning signal is triggered in such a case, so that suitable counter-measures (replacement of the adhesive nozzle 18, correction of the attitude of the roof module 2, etc.) can be taken.

After application of the cylindrical dose of adhesive 16, the roof module 2 is removed from the mobile template 9 by means of a second handling device 20 and passed to an insertion station 21. In the present embodiment, the roof module 2 is tilted through 180° about its longitudinal axis by means of the handling device 20 and inserted, in the installation position, into a transfer template 22, from which it is them picked up by an assembly robot 23 which inserts the roof module 2 into the roof opening 24 of the body 3. The mobile template 9 is transferred back by means of the conveyor device 12 to the starting position and held available there to pick up a further roof module.

The assembly robot 23 carries an assembly tool 25 for the high-precision gripping, positioning and fixing of the roof module 2 in the roof opening 24 of the body 3. During pick-up of the roof module 2 from the transfer template 22 and transfer of the roof module 2, the assembly tool 25 is in a fixed position relative to the assembly robot 23, which follows a programmed-in CNC path. The transfer template 22 for transferring the roof module 2 is floatingly mounted relative to the factory floor by means of roller bearings, so that dimensional inaccuracies of the roof module 2 can be compensated during pick-up of the roof module 2 by the assembly tool 25 by means of horizontal movements of the transfer template 22. For the high-precision pick-up of the roof module 2, the assembly tool 25 is provided with centering tools 27, whose function is described below. During the insertion of the roof module 2 into the body 3, the assembly tool 25 is floatingly mounted relative to the assembly robot 23; this floating mounting permits flexible high-precision positioning of the assembly tool 25 relative to the roof opening 24 with the aid of further centering tools 27', whose function is likewise described below.

Figure 4A:
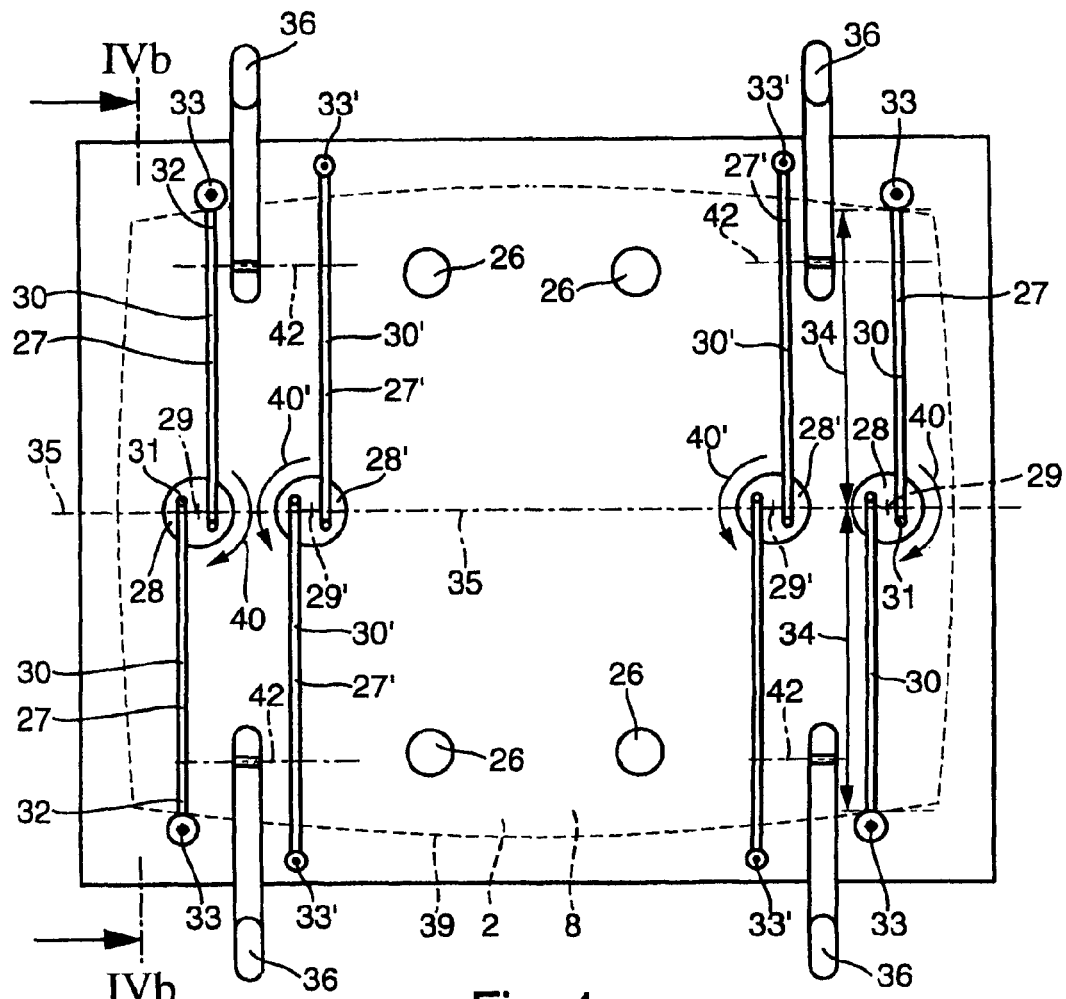
FIG. 4a shows a plan view of an assembly tool for inserting a roof module into a vehicle body.
Figure 4B:
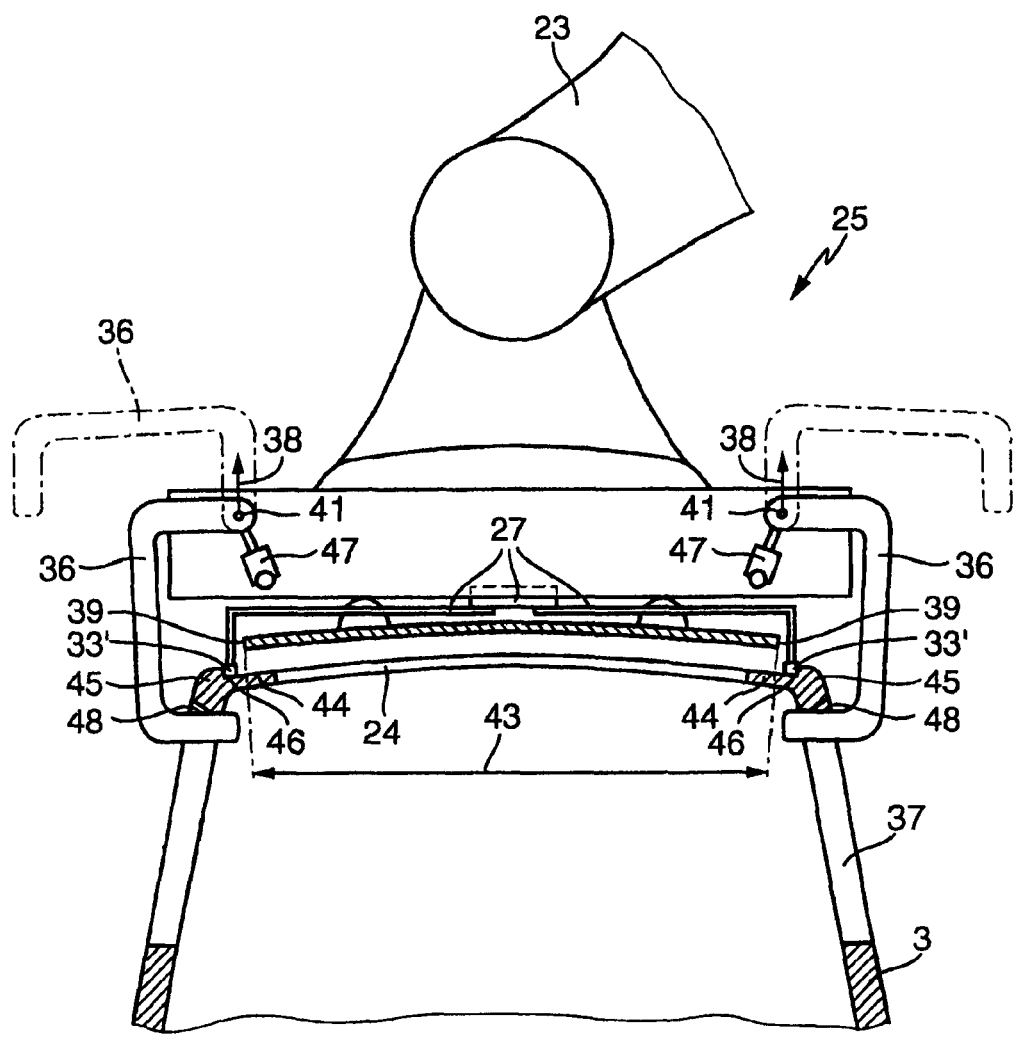
FIG. 4b shows a sectional view of the assembly tool shown in FIG. 4a in section along the line IVb—IVb.

FIG. 4a shows a detailed view of the side of the assembly tool 25 facing the roof module 2; the outer edging 39 of the roof module 2 is indicated by a broken line in this figure. FIG. 4b shows a section in the transverse direction of the vehicle through the assembly tool 25, the roof module 2 and the roof opening 24 of the vehicle body 3.

For lifting and transferring the roof module 2, the assembly tool 25 is provided with vacuum suction cups 26, which permit controlled raising and dropping of the roof module 2. Furthermore, the assembly tool 25 is provided with a (first) pair of centering tools 27, which—as described below—permit positionally accurate reception of the roof module 2 in the assembly tool 25. Each centering tool 27 comprises a rotating element 28, which is fixed on the assembly tool 25 to rotate about a center of rotation 29. Two arms 30 are fixed on each rotating element 28 to be freely rotatable, the articulation points 31 of the two arms 30 on the rotating element 28 being diametrally opposite to one another and being at the same distance from the center of rotation 29. At the ends of the arms 30 remote from the rotating element 28 are fixed, in a freely rotatable manner, rollers 33 (or mouldings of any desired shape, especially adapted to the marginal contour 39 of the roof module 2). The lengths of the two arms 30 of each centering tool 27 and the radii of the two rollers 33 are so dimensioned that the distances 34 between the regions of the rollers 33 lying nearest to the center of rotation 29 and the center of rotation 29 on each arm are of identical length. As a result of a controlled rotation of the rotating element 28, the distances 34 between the regions of the rollers 33 lying nearest to the center of rotation 29 and the center of rotation 29—and hence also the distances apart of the rollers 33—can be selectively varied.

In addition, the assembly tool 25 possesses a further (second) pair of centering tools 27', which—as described below—serve for the positionally accurate positioning of the assembly tool 25 relative to the roof opening 24 of the body 3. Their structural form corresponds to that of the centering tools 27, and their centers of rotation 29' are located on the axis 35 extended by the two centers of rotation 29 (of the first pair of centering tools 27). The effect of this is to ensure that the alignment by means of the first centering tools 27 and the alignment by means of the second centering tools 27' always take place in accordance with the same axis 35. For details of the structure and mode of operation of the centering tools, reference is made to German application DE 198 17 056 A1, the content of which is hereby incorporated by way of reference into the present application.

In addition, the assembly tool 25 disposes of four fixing hooks 36, by means of which the roof module 2 is selectively pressed into the roof opening 24 of the body 3 after installation, in order to ensure precise vertical adjustment and a process-proof adhesive bonding of the roof module 2 in the roof opening 24. The fixing hooks 36 are fixed via pivots 41 on the assembly tool 25, the pivot axes 42 extending approximately parallel to the longitudinal axis of the vehicle. During the gripping of the roof module 2 in the transfer template 22, during the transfer to the vehicle body 3 and during the positioning of the roof module 2 in the roof opening 24, the fixing hooks 36—as indicated in broken lines in FIG. 4b—are swung out laterally over the assembly tool 25 in order to avoid reductions of available space. Each fixing hook 36 is mounted relative to the assembly tool 25 via a controllable hydraulic or pneumatic pressure cylinder 47; by means of this cylinder 47—as indicated by arrows 38 in FIG. 4b—the fixing hooks 36 can be displaced in the vertical direction relative to the assembly tool 25.

A description is given below of the individual steps during removal of the roof module 2 from the transfer template 22 and subsequent insertion into the body 3.

First, the assembly tool 25 is lowered onto the roof module 2 laid in the transfer template 22. The assembly tool 25 is at this time fixed in a firm attitude (in other words, not floating) on the assembly robot 23. The fixing hooks 36 are swung away upwards in order to prevent collisions between fixing hooks 36 and roof module 2. Furthermore, the angular position of the rotating elements 28, 28' of the centering tools 27, 27' is set so that the rollers 33, 33' project laterally beyond the edges 39 of the roof module 2. Now the two rotating elements 28 of the first centering tools 27 are rotated in a controlled manner in the direction of the arrow 40 (FIG. 4a), as a result of which, on each of the two centering tools 27, the distance 34 of the rollers 33 from the respective centers of rotation 29 is reduced. As a result, the transfer template 22 mounted floatingly relative to the factory floor is rotated (together with the roof module 2 fixed thereon) relative to the assembly tool 25. The rotating elements 28 are rotated until all rollers 33 lie on the edges 39 of the roof module 2, so that no further rotation is possible; the roof module 2 is then so oriented relative to the assembly tool 25 that the axis of symmetry of the roof module 2 coincides with the axis 35 of the two centers of rotation 29 on the assembly tool 25. In this position, the suction cups 26 are activated, so that the roof module 2 is now fixed in that orientation relative to the assembly tool 25. The centering tools 27 can then be swung out of the plane of the roof module 2 in order to avoid reductions of available space during the installation of the roof module 2 in the roof opening 24.

The roof module 2 aspirated against the assembly tool 25 is now raised out of the transfer template 22 and transferred to the vehicle body 3 delivered by the assembly line 4. During the installation of the roof module 2, the body 3 is lifted out of the assembly line 4 in a defined position, so that it is in a stationary position relative to the assembly robot 23. The assembly tool 25, mounted floatingly relative to the assembly robot 23, with the roof module 2 fixed thereon, is now oriented with high precision relative to this stationary body 3. During this orientation, the roof module 2—as shown in FIG. 4b—is raised in the vertical direction relative to the body 3, so that the cylindrical doses of adhesive 16 do not contact the flanges 44 of the roof opening 24 that lie opposite to them.

For the centering of the assembly tool 25 (and hence also of the roof module 2) relative to the body 3, the centering tools 27' are used. The rotating elements 28' of these centering tools 27' are first located in a position of rotation in which the rollers 33' and the end of each arm 30' rest on the roof edges 39 (see FIG. 4b), so that the rollers 33' can be introduced between the two roof struts 45 of the body 3. The two rotating elements 28' are then rotated in a controlled manner in the direction of the arrow 40' (see FIG. 4a). When this occurs, the two arms 30' are moved into an extended position and the rollers 33' (or mouldings) are splayed away from the center of rotation 29' until all rollers 33' rest on the insides 46 of the roof struts 45. The assembly tool 25 with the roof module 2 fixed thereon is then positioned between the roof struts in such a way that the axis 35 of the centers of rotation 29, 29' (and hence also the axis of symmetry of the roof module 2) are disposed precisely centrally relative to the roof struts 45.

In this orientation, the assembly tool 25 is lowered onto the vehicle body 3. The cylindrical doses of adhesive 16 are so dimensioned here that the roof module 2 sinks incompletely into the roof opening 24 under its own dead weight, in other words so that the edges 39 of the roof module 2 project in the height direction (vertical direction) beyond the roof struts 45.

Whereas in the embodiment shown in FIGS. 4a and 4b the first pair of centering tools 27 (for orienting the assembly tool 25 relative to the roof module 2) and the second pair of centering tools 27' (for orienting the assembly tool 25 relative to the roof struts 45) represent separate components, the two functions can also be combined in a single pair of centering tools 27". These centering tools 27" have the same structure as the centering tools 27, 27'. For the orientation of the assembly tool 25 relative to the roof module 2, they are placed under tractive stress (in the direction of the arrow 40 in FIG. 4a), whereas for orientation of the assembly tool 25 relative to the roof struts 45 they are placed under compressive stress (in the direction of the arrow 40' in FIG. 4a).

After the lowering of the roof module 2 onto the flanges 44 of the roof opening 24, in a subsequent step the roof module 2 is now pressed into the roof opening 24 of the body 3 to the desired depth by means of the assembly tool 25. For this purpose, the fixing hooks 36 are swung into the window openings 37 of the body 3 about their pivot axes 42. The pressure cylinders 47 of the fixing hooks 36 are then subjected to pressure, so that the fixing hooks 36 are pulled in the direction of the assembly tool 25 and forces build up between the upper sides 48 of the fixing hooks 36, engaging into the window openings 37, and the assembly tool 25, which forces pull down the assembly tool 25 onto the body 3 and so press the roof module 2 into the roof opening 24 of the body 3.

The forces applied by the pressure cylinders 47 are adjusted by means of force adjusters which guarantee that the roof module 2 is pressed into the roof opening 24 with the same force by all fixing hooks 36. Alternatively, sensors may be provided, by means of which the height of the roof module 2 relative to the body 3 is detected; the force of the four pressure cylinders 47 is increased repeatedly until such time as the desired height of installation is reached. In this position, the fixing hooks 36 hold the roof module 2 for a few seconds in order to ensure fixing of this installed position.

In addition to the sensors by means of which—as mentioned above—the height of the inserted roof module 2 by comparison with the roof opening 24 can be measured, further sensors 49 are provided in the assembly system 1 which serve to verify the correct position of the roof module 2 in the roof opening 24; these sensors 49 serve in particular to measure the gap dimensions between the outer edges 39 of the roof module 2 and the inner edges 46 of the roof struts 45. The measurement takes place immediately after insertion of the roof module 2 into the roof opening 24. In the event of defective insertion, the position of the roof module 2 can be readjusted immediately—in other words, before setting of the adhesive—by means of the assembly tool 25. Alternatively, inaccuracies in the insertion of the roof module 2 may be corrected manually. Optical light-section sensors are used as the sensors 49. They permit rapid, contact-free online measurement; the measured results are in electronic form and can be used directly as a control parameter for automatic correction of the position of the roof module 2.

After installation of the roof, the vehicle body 3 is moved away in the direction of the arrow 5 by means of the assembly line 4. In addition to the automatic insertion station 21, a trolley conveyor 60 is also provided, by means of which the roof modules 2 provided with adhesive are manually transferred to the assembly line 4 and can be manually introduced there into the body 3.

The control of the assembly system 1 is provided by means of a control system 50, which controls the individual steps of the individual components of the assembly system 1 and matches them to one another.

In particular, by means of the control system 50, the individual steps for the application of adhesive to the inside 8 of the roof module 2 on the one hand and the passing of the body 3 to the insertion station 21 on the other hand are so coordinated in time that synchronization of these operations is achieved. As a result of a prompt commencement of the application of adhesive it is possible to ensure that the roof module 2, provided with cylindrical doses of adhesive 16, is gripped and raised by the assembly tool 25 at exactly that point in time at which the associated body 3 on the assembly line 4 enters the insertion station 21. In order to achieve this, a sensor 52 is provided at a point 51 in the assembly line 4 upstream of the roof module assembly system 1, by means of which sensor 52 the arrival of a body 3 at that point 51 is detected. A measurement signal from the sensor 52 then triggers the start of the adhesive application operation.

It is often necessary, in addition to the bodies 3 which are to be provided with a roof module 2 in the course of assembly, also to assemble on the same assembly line 4 bodies 3' in which no roof module is to be installed (because, for example, they already have a solid roof 2'). In this case, the bodies 3, 3' are provided with electronic data storage media 53, on which the equipment of the respective body 3, 3' is stored. The sensor 52 provided on the assembly line 4 is then so designed that it reads the data from the electronic data storage medium 53. From these data, it is determined whether a solid roof 2' has already been installed in a body 3, 3' which is passing the sensor 52 at that time or whether a roof module 2 is to be installed. If a roof module 2 is to be installed, the application of adhesive to a roof module 2 and the subsequent installation of the roof module 2 in the body 3 are triggered via the control system 50. If this is not the case, the preparation of the roof module for the body 3' in question is omitted. The positioning of the sensor 52 relative to the assembly system 1 depends upon the speed of the assembly line 4 and on the lead time necessary for the preparation of the roof module 2 to be installed (for feeding it to the adhesive bonding station 7, applying the adhesive and transferring it to the assembly tool 25). Advantageously, a further sensor 59 (for example, a light barrier) is provided to check the bodies 3, by means of which a check is conducted to determine whether the particular body 3 delivered already has a (fitted) roof; in this case, the control system 50 receives a pulse that suppresses the installation of a (possibly incorrectly prepared) roof module 2.

As an alternative to the use of the sensor 52 for detecting the assembly sequence, the assembly sequence may also be stored in a production control system 55 and transmitted by that production control system 55 to the control system 50 of the assembly system 1.

The control system 50 also monitors the period elapsing between the start of application of adhesive to the joint regions 13 of the roof module 2 and the insertion of that roof module 2 into a vehicle body 3 to ensure that the "potlife" of the adhesive is not exceeded. The potlife depends, inter alia, on the chemical composition and processing temperature of the adhesive used and described the interval of time within which the adhesive must be used up after its emergence from the adhesive nozzle 18 in order to achieve sufficiently good adhesion properties. If the potlife is exceeded on a particular roof module 2 (for example, because of a breakdown of the assembly line 4 or because of the outward transfer of a vehicle body 3), the roof module 2 in question is singled out; if appropriate, a new roof module 2 is prepared immediately and is then bonded into the next body 3 instead of the singled-out roof module 2. The singled-out roof module 2 is initially laid on a standby support 54 and can subsequently be cleaned and reused.

The control system 50 continuously monitors the interval of time since the last release of adhesive from the adhesive nozzle 18 of the bonding robot 17. If that period exceeds a particular, preset maximum value, a cylindrical dose of adhesive of a predetermined length is emitted from the adhesive nozzle 18 and disposed of immediately. This is particularly important if several body variations 3, 3' are being transported on the assembly line 4, only some of which are to be provided with a bonded-in roof module 2; in this case, such a long time may elapse between two consecutive modular roof requirements that the adhesive hardens in the adhesive nozzle 18, which may result in the blocking of the adhesive nozzle 18 and/or reduced adhesive quality.

In addition, the control system 50 monitors the buffer stock of unstacked roof modules 2, in other words the number of mobile templates 9 loaded with a roof module 2. If the control system 50 detects insufficient coverage, a signal is emitted which alerts the machine supervisor to the fact that additional roof modules 2 require loading. If different roof modules are available for installation, depending on the version to be produced, a check is carried out prior to the delivery of each new body 3 to determine whether a roof module 2 corresponding to the required version is being held ready in one of the mobile templates 9; that template 9 is then transferred in so that the roof module 2 in question is delivered to the insertion station 21 in synchrony with the arrival of the body 3.

Whereas only the installation of a single version of the roof module 2 in the bodies 3 passing on the assembly line 4 has hitherto been considered, it is fundamentally possible, with the roof module assembly system 1 described above, to fit different types and versions of roof modules. Thus, for example, a glass roof may be inserted into a first delivered body 3 while a slatted roof of the same length/breadth is installed in a second body 3 and a solid roof of the same length/breadth in a third body 3. In this case, different roof versions 2 are held ready in the templates 9 and, as required, are transferred by the first handling device 6 to the adhesive bonding station 7, provided with adhesive and inserted into the body 3 at the insertion station 21. In order to prepare the roof module 2 needed in each case promptly, the version of the body 3 arriving is detected sufficiently ahead of time by means of the sensor 52 located on the assembly line 4 and reported to the control system 50; the control unit 50 then triggers the inward transfer of a template 9 loaded with the desired roof type, so that the roof module 2 required arrives at the right time at the adhesive bonding station 7 and the insertion station 21.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

I claim:

1. An assembly system for installing a roof module with respect to a roof opening of a vehicle body delivered on an assembly line, comprising:
    an adhesive bonding station comprising a bonding robot for applying a dose of adhesive to an inside of the roof module;
    an insertion station comprising an assembly robot for inserting the roof module provided with adhesive into the body;
    a first handling device for supplying the roof module to the adhesive bonding station and positioning it therein;
    a second handling device for removing the roof module from the adhesive bonding station and supplying it to the insertion station; and
    a control system for controlling the bonding robot, the assembly robot and the handling devices.

2. The assembly system according to claim 1, wherein a protective adhesive tape in a joint region of the roof module is removed before supplying the roof module to the adhesive bonding station.

3. The assembly system according to claim 2, wherein the bonding robot possesses an adhesive nozzle having a spring, the spring pressing the adhesive nozzle onto the joint region of the roof module.

4. The assembly system according to claim 3, wherein the assembly robot comprises an assembly tool for gripping and transferring the roof module and mounted to float relative to the robot.

5. The assembly system according to claim 4, wherein the assembly tool comprises centering tools to receive the roof module with accurate positioning.

6. The assembly system according to claim 4, wherein the assembly tool comprises centering tools for accurate positioning relative to the roof opening of the body.

7. The assembly system according to claim 4, wherein the assembly tool comprises fixing hooks which engage into window openings of the body while the roof module is under contact pressure.

8. The assembly system according to claim 3, and further comprising an optical sensor for measuring an installed position of the roof module in the body.

9. The assembly system according to claim 3, wherein the control system of the assembly system is linked to a production control system and receives information therefrom relating to a sequence of vehicle bodies on the assembly line.

10. The assembly system according to claim 3, wherein the control system of the assembly system is linked to a sensor on the assembly line from which the control system receives information relating to a sequence of vehicle bodies on the assembly line.

11. The assembly system according to claim 2, wherein the assembly robot comprises an assembly tool for gripping and transferring the roof module and mounted to float relative to the robot.

12. The assembly system according to claim 11, wherein the assembly tool comprises centering tools to receive the roof module with accurate positioning.

13. The assembly system according to claim 11, wherein the assembly tool comprises centering tools for accurate positioning relative to the roof opening of the body.

14. The assembly system according to claim 11, wherein the assembly tool comprises fixing hooks which engage into window openings of the body while the roof module is under contact pressure.

15. The assembly system according to claim 2, and further comprising an optical sensor for measuring an installed position of the roof module in the body.

16. The assembly system according to claim 2, wherein the control system of the assembly system is linked to a production control system and receives information therefrom relating to a sequence of vehicle bodies on the assembly line.

17. The assembly system according to claim 2, wherein the control system of the assembly system is linked to a sensor on the assembly line from which the control system receives information relating to a sequence of vehicle bodies on the assembly line.

18. The assembly system according to claim 1, wherein the first handling device comprises a pivot device by which the roof module can be pivoted through approximately 80°.

19. The assembly system according to claim 18, wherein the assembly robot comprises an assembly tool for gripping and transferring the roof module and mounted to float relative to the robot.

20. The assembly system according to claim 19, wherein the assembly tool comprises centering tools to receive the roof module with accurate positioning.

21. The assembly system according to claim 19, wherein the assembly tool comprises centering tools for accurate positioning relative to the roof opening of the body.

22. The assembly system according to claim 19, wherein the assembly tool comprises fixing hooks which engage into window openings of the body while the roof module is under contact pressure.

23. The assembly system according to claim 18, and further comprising an optical sensor for measuring an installed position of the roof module in the body.

24. The assembly system according to claim 18, wherein the control system of the assembly system is linked to a production control system and receives information therefrom relating to a sequence of vehicle bodies on the assembly line.

25. The assembly system according to claim 18, wherein the control system of the assembly system is linked to a sensor on the assembly line from which the control system receives information relating to a sequence of vehicle bodies on the assembly line.

26. The assembly system according to claim 1, wherein the assembly robot comprises an assembly tool for gripping and transferring the roof module and mounted to float relative to the robot.

27. The assembly system according to claim 26, wherein the assembly tool comprises centering tools to receive the roof module with accurate positioning.

28. The assembly system according to claim 27, and further comprising an optical sensor for measuring an installed position of the roof module in the body.

29. The assembly system according to claim 27, wherein the control system of the assembly system is linked to a production control system and receives information therefrom relating to a sequence of vehicle bodies on the assembly line.

30. The assembly system according to claim 27, wherein the control system of the assembly system is linked to a sensor on the assembly line from which the control system receives information relating to a sequence of vehicle bodies on the assembly line.

31. The assembly system according to claim 26, wherein the assembly tool comprises centering tools for accurate positioning relative to the roof opening of the body.

32. The assembly system according to claim 31, wherein the control system of the assembly system is linked to a production control system and receives information therefrom relating to a sequence of vehicle bodies on the assembly line.

33. The assembly system according to claim 31, wherein the control system of the assembly system is linked to a sensor on the assembly line from which the control system receives information relating to a sequence of vehicle bodies on the assembly line.

34. The assembly system according to claim 26, wherein the assembly tool comprises fixing hooks which engage into window openings of the body while the roof module is under contact pressure.

35. The assembly system according to claim 31, and further comprising an optical sensor for measuring an installed position of the roof module in the body.

36. The assembly system according to claim 34, wherein the control system of the assembly system is linked to a production control system and receives information therefrom relating to a sequence of vehicle bodies on the assembly line.

37. The assembly system according to claim 34, and further comprising an optical sensor for measuring an installed position of the roof module in the body.

38. The assembly system according to claim 34, wherein the control system of the assembly system is linked to a sensor on the assembly line from which the control system receives information relating to a sequence of vehicle bodies on the assembly line.

39. The assembly system according to claim 26, and further comprising an optical sensor for measuring an installed position of the roof module in the body.

40. The assembly system according to claim 26, wherein the control system of the assembly system is linked to a production control system and receives information therefrom relating to a sequence of vehicle bodies on the assembly line.

41. The assembly system according to claim 26, wherein the control system of the assembly system is linked to a sensor on the assembly line from which the control system receives information relating to a sequence of vehicle bodies on the assembly line.

42. The assembly system according to claim 1, and further comprising an optical sensor for measuring an installed position of the roof module in the body.

43. The assembly system according to claim 42, wherein the control system of the assembly system is linked to a production control system and receives information therefrom relating to a sequence of vehicle bodies on the assembly line.

44. The assembly system according to claim 42, wherein the control system of the assembly system is linked to a sensor on the assembly line from which the control system receives information relating to a sequence of vehicle bodies on the assembly line.

45. The assembly system according to claim 1, wherein the control system of the assembly system is linked to a production control system and receives information therefrom relating to a sequence of vehicle bodies on the assembly line.

46. The assembly system according to claim 1, wherein the control system of the assembly system is linked to a sensor on the assembly line from which the control system receives information relating to a sequence of vehicle bodies on the assembly line.

47. The assembly system according to claim 1, wherein said roof module comprises a glass roof.

48. The assembly system according to claim 1, wherein said dose of adhesive is cylindrical.

49. A process of installing a roof module with respect to a roof opening of a vehicle body delivered on an assembly line, comprising:

supplying the roof module to an adhesive bonding station by way of a conveyor device;

applying a dose of adhesive to an inside of the roof module with a bonding robot;

removing the roof module from the adhesive bonding station with a handling device and supplying the roof module to an insertion station; and inserting the roof module provided with adhesive into the body with an assembly robot.

* * * * *